Feb. 23, 1926.
J. TAYLOR
SUBMERGED BEARING MOUNTING
Filed July 29, 1925
1,574,211
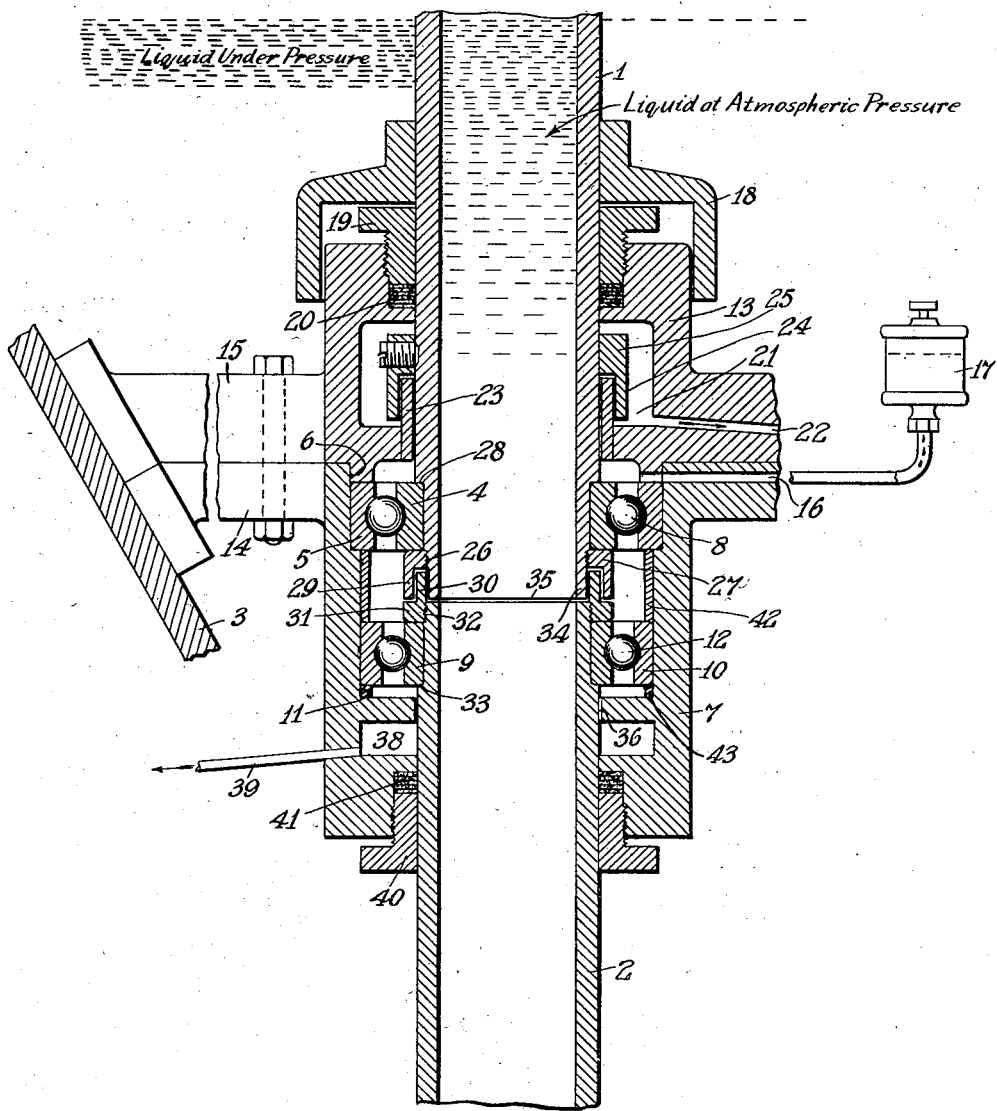
INVENTOR
John Taylor
ATTORNEY Patented Feb. 23, 1926.

1,574,211

UNITED STATES PATENT OFFICE.

JOHN TAYLOR, OF BRONXVILLE, NEW YORK, ASSIGNOR TO THE HESS-BRIGHT MANUFACTURING COMPANY, OF PHILADELPHIA, PENNSYLVANIA, A CORPORATION OF PENNSYLVANIA.

SUBMERGED BEARING MOUNTING.

Application filed July 29, 1925. Serial No. 46,723.

*To all whom it may concern:*

Be it known that I, JOHN TAYLOR, a citizen of the United States, residing at Bronxville, New York, have invented certain new and useful Improvements in Submerged Bearing Mountings, of which the following is a specification.

This invention relates to means for housing and enclosing an anti-friction mounting for the abutting ends of two tubular conduit sections and has for an object to prevent the intermingling of the conveyed liquid, the lubricant, and the liquid in which the device is submerged. Without further attempt to describe my invention in this preamble I shall pass directly to the detailed description having reference to the accompanying drawings.

The drawings show in vertical central section one practicable embodiment of my invention.

One of the purposes of the mechanism to which my invention is applied is to pass liquid at an atmospheric pressure by means of a conduit consisting of independently rotatable tubes, 1 and 2, through a body of liquid contained or passing under considerable pressure through an outer structure, 3. The problem to which my invention is presented as a solution is to properly lubricate the anti-friction bearings mounted on the abutting ends of the tubes, 1—2, in such manner that the lubricant applied to the bearings shall not pass into the conduit, 1—2, nor into the chamber of the shell, 3, in fact it is to prevent any two of the liquids coming together and intermingling or one fouling the other.

The lower end of the conduit member, 1, is shown circumferentially reduced forming a seat for the inner ring, 4, of a ball bearing, the outer ring, 5, of such bearing being shown mounted in the enlarged bore, 6, of the housing member, 7. The row of balls in this bearing is indicated by the reference character, 8. This particular bearing 4—8—5 is in the nature of a step bearing and is represented as taking the thrust as well as the radial load of the conduit tube, 1.

The upper end of the conduit tube, 2, is shown similarly circumferentially reduced forming a seat for the inner ring, 9, of an anti-friction bearing, the outer ring, 10, of which is mounted for longitudinal movement in a suitable enlargement, 11, in the bore of the housing member, 11. The row of balls in this bearing is indicated by the reference character, 12.

The housing member, 7, and an upper housing member, 13, are shown provided with laterally disposed web members, 14 and 15, bolted together and secured to the outer shell, 3.

Anti-friction bearings, particularly those having balls as rolling elements, when mounted as indicated in this drawing are preferably lubricated by a slow but continuous flow of oil. The oil inlet, 16, is shown located above the upper bearing 4—5 and supplied by means of an oil cup, 17. The problem of preventing the mixture and contamination of any two of the liquids; the conveyed material, the surrounding material, and the lubricant; necessitates, of course, the introduction of baffle plates and guards. Since the surrounding liquids may contain larger or smaller particles of solid matter which may be of an abrasive nature some device is necessary to shield the parts from the larger and more solid constituents a cap, 18, being shown mounted on the tube, 1, and overhanging the upper end of the housing member, 13, thereby forming a shield and housing for the gland, 19. The gland is of some suitable construction, preferably having a screw threaded connection with the housing member, 3, for suitably compressing the packing, 20. Liquid which may seep past the gland and packing is received in a chamber, 21, which in effect is an enlargement in the bore of the housing member, 13. From this chamber it is led to atmosphere by means of a drain, 22. The inner wall of the chamber, 21, is formed by an upstanding tube, 23, overhung by a sleeve, 24, carried by a collar, 25, adjustably secured to the tube, thereby forming a labyrinth.

Below the seat for the bearing ring, 4, the tube is extended and is screw threaded at, 26, for receiving a ring, 27; in part serving to hold the bearing ring, 4, against the shoulder at 28, and in part for forming a member of a labyrinth. In this latter capacity it is provided with a downwardly projecting sleeve, 29, surrounding another member, 30, of the labyrinth, which is in the form of a sleeve carried by a collar, 31, mounted upon the upwardly projecting screw threaded portion, 32, of the sleeve, 2, and serving to press the inner ring, 9, against the shoulder, 33. The wall of the tube, 1, is extended downwardly at, 34, inside the upstanding sleeve, 30. This labyrinth is to impede the escape of the conveyed liquid through the interval at, 35, between the conduit tubes, 1 and 2. However, under abnormal circumstances a small amount of the conveyed liquid passing the labyrinth will mingle with the lubricant flowing down to the row of balls, 12, and pass through the clearance at, 36, between the housing, 7, and the tube, 2, and into the chamber, 38, whence it will drain out with the lubricant at, 39.

The lower end of the housing, 7, is provided with a gland, 40, pressing packing, 41, for preventing the upward passage of the surrounding liquid. Any of the surrounding liquid which may seep past the gland and packing, 41, will enter the chamber, 30, and void through the drain, 39, before it can ascend the passage, 36, and gain access to the balls, 12, of the lower bearing.

When the major apparatus is in operation the heavier pressure of the fluid contained within the shell, 3, naturally prevents the tendency of the escape of lubricant past the packings, 20 and 41, and any entrance of the surrounding lubricant to the housing for the bearings is led off at the top through the drain, 22, and at the bottom through drain, 39, both of which communicate with the atmosphere. The atmosphere pressures contained are about the same in the conduit 1—2 as they are at the ball bearings so that there is no relative suction from one to another. The natural tendencies of the seepage are it is apprehended to be downward of the conduit and through the line of juncture represented at, 35.

In many installations the conduit section, 2, will be supported at its lower end by a foot step bearing. At times, however, it may be found highly desirable to wholly or partially support this section by means of the bearing 9—10, in which case sleeves shown at 42 and 43 will be placed above and below the ring, 10. By this means and by adjusting the length or height of the sleeve, 43, the amount of clearance between the pipe ends at, 35, may be adjusted and subsequently maintained within very slight tolerances. In most instances there will be a slight clearance between the ends of the tubes, 1 and 2; in other cases they will be substantially in engagement. Owing to this close arrangement I have designated the tubes as abutting endwise although in some instances the relation might more properly be called juxtaposition.

It is to be understood that while for the purpose of illustration I have shown in the drawings and described what I have found in practice to be the best method of carrying out my invention when applied to a vertically disposed conduit, the exigencies of various situations will demand certain changes in detail, which changes may be made within the scope of the claims without departing from the spirit of my invention.

Having thus described my invention, what I claim as new and desire to secure by Letters Patent is:

1. The combination with a pair of endwise abutting tubes, there being a bearing seat formed adjacent the ends of the respective tubes, of a housing surrounding such ends, an anti-friction bearing mounted on each seat and in the housing, nuts having screw threaded connection with the tubes for holding the bearings on their seats, and overlapping sleeves carried by the nuts for forming with the nuts and tubes a labyrinth.

2. The combination with a pair of endwise abutting tubes, there being a bearing seat formed adjacent the ends of the respective tubes, of a housing surrounding such ends, there being glands at the respective ends of the housing and collecting chambers and drains between the bearings and the glands, an anti-friction bearing mounted on each seat and in the housing, nuts having screw threaded connection with the tubes for holding the bearings on their seats, and overlapping sleeves carried by the nuts for forming with the nuts and tubes a labyrinth.

3. The combination with a pair of vertically disposed endwise abutting tubes, there being a bearing seat formed adjacent the ends of the respective tubes, of a housing surrounding such ends, there being glands at the respective ends of the housing and collecting chambers and drains between each bearing and the adjacent gland, an anti-friction bearing mounted on each seat and in the housing, and a labyrinth for shielding the juncture between the tubes.

4. The combination with a pair of endwise abutting tubes, there being a bearing seat formed adjacent the ends of the respective tubes, of a housing surrounding such ends, an anti-friction bearing mounted on each seat and in the housing, and a labyrinth for shielding the juncture between the tubes.

5. The combination with a pair of vertically disposed endwise abutting tubes, there being a bearing seat formed adjacent the ends of the respective tubes, of a housing surrounding such ends, there being glands at the respective ends of the housing and collecting chambers and drains between each bearing and the adjacent gland, a shield located on the uppermost tube above the gland, an anti-friction bearing mounted on each seat and in the housing, and overlapping sleeves carried by the ends of the tubes for forming a labyrinth.

6. The combination with a pair of vertically disposed endwise abutting tubes, there being a bearing seat formed adjacent the ends of the respective tubes, of a housing surrounding such ends, there being glands at the respective ends of the housing and collecting chambers and drains between each bearing and the adjacent gland, an anti-friction bearing mounted on each seat and in the housing, nuts having screw threaded connection with the tubes for holding the bearings on their seats, and overlapping sleeves carried by the nuts for forming with the nuts and tubes a labyrinth; and means for supplying oil to the housing above the uppermost bearing.

7. The combination with a pair of vertically disposed endwise abutting tubes, there being a bearing seat formed adjacent the ends of the respective tubes, of a housing surrounding such ends, there being glands at the respective ends of the housing and collecting chambers and drains between each bearing and the adjacent gland, a shield located on the uppermost tube above the gland, an anti-friction bearing mounted on each seat and in the housing, nuts having screw threaded connection with the tubes for holding the bearings on their seats, and overlapping sleeves carried by the nuts for forming with the nuts and tubes a labyrinth; and means for supplying oil to the housing above the uppermost bearing.

Signed at the city of New York, N. Y., this 25th day of July, 1925.

JOHN TAYLOR.